W. W. TEMPLES.
FLUID PRESSURE VALVE.
APPLICATION FILED AUG. 10, 1910.
999,273.
Patented Aug. 1, 1911.
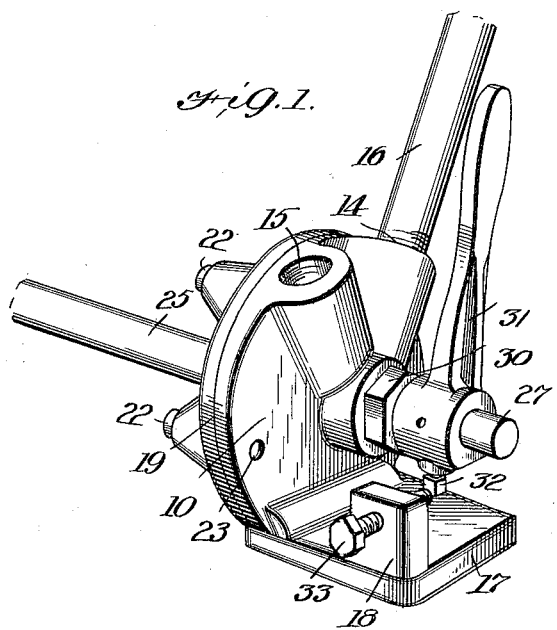
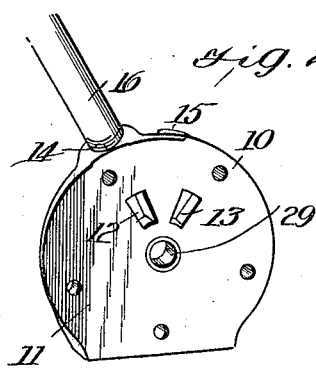
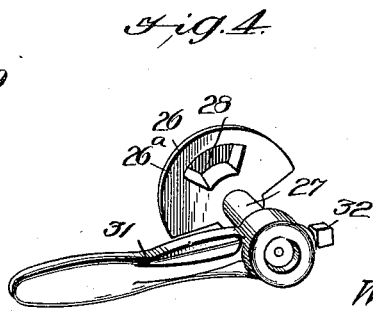
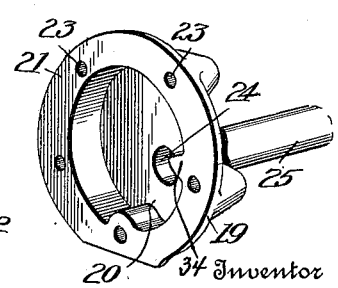
Witnesses
F. C. Barry
M. A. Schmidt
Inventor
William W. Temples
By Milo B. Stevens & Co.
Attorneys

UNITED STATES PATENT OFFICE.

WILLIAM W. TEMPLES, OF COLUMBUS, GEORGIA.

FLUID-PRESSURE VALVE.

999,273. Specification of Letters Patent. Patented Aug. 1, 1911.

Application filed August 10, 1910. Serial No. 576,480.

*To all whom it may concern:*

Be it known that I, WILLIAM W. TEMPLES, a citizen of the United States, residing at Columbus, in the county of Muscogee and State of Georgia, have invented certain new and useful Improvements in Fluid-Pressure Valves, of which the following is a specification.

My present invention relates to fluid pressure valves, my object being to provide a simple, strong and efficient valve so constructed as to operate with a minimum of wear to the parts, and to enable limitation of its movements by simple and adjustable means.

In the accompanying drawing, which shows the details of my invention, Figure 1 is a perspective view of the complete device. Fig. 2 is a similar view of the valve seat portion. Fig. 3 is a similar view of the casing, and, Fig. 4 is a similar view of the valve piece, stem, and lever.

Referring now to these figures, the valve seat portion 10 is circular in form and has an imperforate outer surface and a smooth flat inner surface 11 in which is formed a pair of contiguous openings 12 and 13. These openings 12 and 13 communicate respectively with supply and exhaust ports 14 and 15 formed radially therefrom through the edge of the member 10, and the port 14 of which, in use, has connected therein a supply pipe 16 leading to the point where the pressure is needed. This portion 10 is also provided with a base piece 17 extending laterally and outwardly therefrom and provided at one side with a lug 18 for a purpose which will be hereinafter apparent.

The casing portion 19 has an inner surface provided with a central circular cavity 20 and with a flat-surfaced rim 21 around said cavity, and is of similar shape and size to the portion 10, so that it may be secured in face to face relation with the said portion 10 by means of a circular series of machine screws 22 through openings 23 for their reception. The inlet port 24, which may have an inlet pipe 25 connected thereto, extends through casing 19 and communicates with its cavity 20.

The valve piece 26, which is integral with the inner end of its stem 27, is segmental in shape and has a flat inner surface 26$^a$ provided with a central cavity 28. In the assembled form, this valve piece moves within the cavity 20 of casing 19, with its stem 27 extending exteriorly through a central opening 29 in the seat portion 10, at the end of which is a stuffing box 30 to prevent leakage. Thus the pressure through inlet port 24, which is constant, holds the valve piece 26 with its smooth flat surface 26$^a$ against the smooth flat surface 11 of the seat portion 10, upon which it may be moved to cover the exhaust opening 13 and uncover the supply opening 12 to the inlet, or to a position where its cavity 28 laps the supply and exhaust openings 12 and 13 to allow the pressure in the supply pipe 16 to leak out through exhaust port 15.

The valve piece 26 is moved by means of an upstanding lever 31, secured upon the outer end of its stem 27 by a set screw 32, forming a projection in whose path of movement in one direction is an adjusting screw 33 threaded through the lug 18 of the base 17 and which may be adjusted to limit the movement of the valve piece 26 in a direction to lap the openings 12 and 13. In this manner the supply opening 12 may be lapped to a variable extent, dependent upon the speed at which it is desired to have the pressure in supply pipe 16 leak off or exhaust.

The rim of the cavity 20 has a stop lug 34 which is in the path of one end of the valve 26, and is engaged by said valve when it is in wide open exhaust position. If the exhaust is to be thrown wide open, said screw 33 will be backed into inoperative position, so that the valve can be placed in wide open exhaust position, in which position one end of the valve engages the stop lug.

I claim:

A valve comprising a pair of matching casing members secured in face-to-face relation, one of said members having a smooth inner surface to form a valve seat, and provided with supply and exhaust ports, and the other one of said members having a cavity and an inlet thereto, the rim of the cavity having a stop lug and the aforesaid supply and exhaust ports opening through the valve seat into the cavity, a valve working within the cavity of the second member, and having a flat surface pressed against the flat surface of the first member, by the pressure within the cavity, said valve controlling the supply and exhaust ports, and having a cavity in its face adapted to lap the inlet and exhaust ports, and one end of the valve engaging the aforesaid stop lug when in wide open exhaust position, operating means for the valve piece, and adjustable means on the outside of the valve casing for limiting the movement of the valve operating means.

In testimony whereof I affix my signature in presence of two witnesses.

WILLIAM W. TEMPLES.

Witnesses:
J. K. KING,
J. H. DU PREE.

Copies of this patent may be obtained for five cents each, by addressing the "Commissioner of Patents, Washington, D. C."